(12) United States Patent
Prabhu

(10) Patent No.: US 6,729,699 B1
(45) Date of Patent: May 4, 2004

(54) INVOCATION MAP BASED ARCHITECTURE FOR PROGRAM EXECUTION

(75) Inventor: Shreekanth Prabhu, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 09/678,935

(22) Filed: Oct. 4, 2000

(51) Int. Cl.⁷ .................................... G06F 15/163
(52) U.S. Cl. .................. 709/310; 709/316; 717/108
(58) Field of Search ................ 709/310, 316; 717/118, 108, 146, 159; 700/90; 712/228; 707/102

(56) References Cited

U.S. PATENT DOCUMENTS

| | | | | |
|---|---|---|---|---|
| 5,307,492 A | * | 4/1994 | Benson | 717/159 |
| 5,335,332 A | * | 8/1994 | Christopher et al. | 700/90 |
| 5,574,854 A | * | 11/1996 | Blake et al. | 714/28 |
| 5,848,423 A | * | 12/1998 | Ebrahim et al. | 707/206 |
| 6,167,565 A | * | 12/2000 | Kanamori | 717/146 |
| 6,314,558 B1 | * | 11/2001 | Angel et al. | 717/118 |
| 6,415,334 B1 | * | 7/2002 | Kanamori | 709/316 |
| 6,434,566 B1 | * | 8/2002 | Ferragina et al. | 707/102 |
| 6,542,991 B1 | * | 4/2003 | Joy et al. | 712/228 |
| 6,557,046 B1 | * | 4/2003 | McCauley et al. | 709/318 |

\* cited by examiner

*Primary Examiner*—Van Nguyen
(74) *Attorney, Agent, or Firm*—T. Rao Coca; Anthony V. S. England; Manny Schecter

(57) ABSTRACT

The present invention provides a method and system for passing parameters to a procedure characterized in that it uses an invocation map data structure to pass parameters to the procedure without using the stack, for more efficient operation. The instant invention also provides a computer program product for carrying out the instant invention.

51 Claims, 10 Drawing Sheets

Steps leading to creation of Executable that incorporates Invocation Maps

Figure 1. Procedure Hierarchy

01 Root-Proc

Data Declaration block

02 Proc-1

Data Declaration block

03 Proc-1.1 redefines Proc-2.11

02 Proc-2

Data Declaration block

03 Proc-2.1

Data Declaration block

04 Proc-2.11

Data Declaration block

Figure 2: Hierarchical Declaration Map

01 Procedure Proc-1
  Parametric:
    Param-1 type integer mode input
    Param-2 type pointer mode input
    Param-3 type pointer mode output
    Param-4 type integer mode Return Value
  Private:
    Var-1 type integer
    Var-2 Array of 10 integers
  Persistent:
    Var-3 Structure Item-table

Figure 3: Data Declaration Block

Figure 4: Steps leading to creation of Executable that incorporates Invocation Maps Figure 5: Invocation Map status through the course of Program Execution

Figure 6: Parameter passing in conventional program execution model

Figure 6A: Parameter Access Mechanism in Invocation Map Based Architecture

Figure 7: Repetitive Program Execution in conventional programming model

Figure 7A: Repetitive Program Execution using Invocation Map based Architecture

INVOCATION MAP BASED ARCHITECTURE FOR PROGRAM EXECUTION

FIELD OF THE INVENTION

This invention relates to invocation map based architecture for program execution.

BACKGROUND OF THE INVENTION

Current popular software systems make use of two key concepts namely processes and procedure calls to implement any required functionality. The operating system and associated middle-ware is typically implemented as a set of system procedure calls. The applications are implemented as a set of processes, which have their own private data areas that are not accessible to other processes while executing application level code. There are also privilege levels, which allow free access for all system level memory along with address space of application under execution. There are other mechanisms such as shared memory and inter-process messages that help in inter-process communication. The operating system itself makes use of a layered architecture in which a mechanism of messages or shared memory is used to communicate between different layers. In other cases the operating system is designed, as a set of modules containing assorted procedure calls that call each other to accomplish desired functionality.

As indicated above, a typical full-blown software system, which is used for reasonably serious use, contains several layers of software. The layered structure of operating system contains kernel services, over which are layered device drivers, file systems, database engines, transaction monitors and message queuing systems and over and above these are windowing and GUI related software. The complex applications within themselves have many modules and layering. Accomplishing any task involves passing of information through several layers of software back & forth. As each layer is designed to be as general purpose and generic as possible there are chances of sub-optimal implementation and performance penalties. There have also been increasing popularity of data encapsulation and information hiding with the increasing use of object oriented techniques. This again calls for extensive use of messages between different execution units of code. The object-oriented implementations again make use of significant amount of message passing that in turn has scope for performance degradation.

Most of the procedural invocations make use of stacks which implies repeated copying of parameters starting from a procedure that provides inputs all the way to the procedures that performs the last part of processing.

Another point to consider is that a typical end-user executes a set of frequently used and related applications on his system such as a browser, a word-processor, and a spreadsheet program and may be a mail client. If there are mechanisms which allow a tighter integration and collaborative execution by way of easier sharing of data then the system performance can be significantly enhanced.

Even in an industrial strength application, certain execution paths are more frequently used and a tighter integration between the relevant modules can lead to greater execution efficiencies. When the integration is loose, there is lot of duplication of similar functions in different modules and also tendency to grow the size of software by an overwhelming expansion of feature set. This could make the frequently used operations inefficient as they carry the overhead of large amount of rarely used code as part of the execution image.

With the availability of massive parallel, symmetric multi-processor, NUMA and cluster technologies, it becomes possible to migrate applications from a client-server environment to a high performance server centric environment that can exploit the tight integration of disparate elements of the system in one place. Also cheap availability of huge memory pools again opens up new opportunities for architectural innovation. The availability of machines with bigger machine words makes higher liner (virtual) addresses achievable for programs running even on low-end machines.

In summary, existing system architectures, based on stack-oriented parameter passing between procedures, are subject to the following limitations:

Performance penalty owing to the overhead of loading parameters onto the stack and unloading parameters from the stack for each instance of a procedure call, Unnecessary duplication of similar functions in different modules of an application leading to execution inefficiencies, Poor integration between frequently used and related application, Inefficient support of symmetric multiprocessor, parallel computing, NUMA and cluster technologies for performance enhancement.

THE OBJECT AND SUMMARY OF THE INVENTION

The object of this invention is to obviate the above mentioned drawbacks and provide an efficient system of parameter passing that avoids unnecessary duplication of functions and supports effective integration of applications and multi-processing environment.

To achieve the said objective, this invention provides in a computing system containing at least one processor, memory and storage devices and input and output devices, said computing system executing software programs in which parameters are passed to procedures characterized in that it includes an invocation map data structure means for passing parameters to a procedure without using the stack for more efficient operation.

The said invocation map data structure means has the facility to be used repeatedly.

The said invocation map data structure means is a shared data repository for several procedures.

The said invocation map data structure means includes the facility to be shared across nested procedures.

The said invocation map data structure means is derived from a hierarchical declaration map means based on calling relationships between procedures, comprising assigning level numbers to each level in the procedure calling hierarchy.

The said invocation map data structure means is constructed to capture the complete hierarchical relationship between the procedures.

A new invocation map data structure means is created and used if the existing invocation map data structure means is in use and a concurrent execution is desired.

A new invocation map data structure means is created or a free invocation map data structure means is used if procedure recursion is required.

The said invocation map data structure means is created with a unique map identification and is structured as follows:

```
Invocation Map {Procedure Name
    Instance ID
        Invocation Map Identifier
        Use-flag
    Save-flag
    Saved_program_counter
        Pointer to Parametric data
        Pointer to Private Data
        Pointer to sibling invocation map
        Pointer to child invocation map
    Pointer to next invocation map for same procedure
    Pointer to Parent invocation Map
        }
```

The 'use flag' for a procedure invocation map data structure means is set to '1' at the start of the execution and reset at the end of the execution of a procedure.

The 'Save Flag' in said invocation map data structure means saves the parameters for reuse by a subsequent invocation of the procedure.

The said invocation map data structure means is constructed to initialize any parameter within its enclosed procedural hierarchy including initialization before calling at the structure level so as to avoid creation of multiple copies of the said parameter.

The said invocation map data structure means support recursion and iteration of procedures for which the number of times the procedure will be invoked is known only during run-time.

The data areas for said invocation map data structure means are pre-allocated and can grow along with program execution.

The said invocation map data structure means is declared only once using hierarchical declaration map and referred from anywhere.

The said invocation map data structure means is created as an .imap file during procedure compilation and contains the declaration of the procedure in its own hierarchical map.

The said invocation map data structure means is visible only within the scope of related procedures.

Each invocation of the invocation map data structure means is allocated a separate data area accessible only by its owning thread, such data areas being allocated along with Guard Pages separating each allocation area to avoid possible overlapping.

This invention also provides a method for passing parameters to a procedure characterized in that it uses an invocation map data structure to pass parameters to the procedure without using the stack, for more efficient operation.

The said invocation map data structure can be used repeatedly.

The said invocation map data structure is a shared data repository for several procedures.

The said invocation map data structure can be shared across nested procedures.

The above method includes deriving of said invocation map data structure from a hierarchical declaration map based on calling relationships between procedures comprising assigning level numbers to each level in the procedure calling hierarchy.

The above method includes constructing of said invocation map data structure comprising capturing of the complete hierarchical relationship between the procedures.

The above method includes creating and using of a new invocation map if the existing invocation map is in use and a concurrent execution is desired.

The above method includes creating a new invocation map or using a free invocation map if procedure recursion is required.

The above method includes creating said invocation map data structure with a unique map identification and structuring it as follows:

```
Invocation Map {Procedure Name
    Instance ID
        Invocation Map Identifier
        Use-flag
    Save-flag
    Saved_program_counter
        Pointer to Parametric data
        Pointer to Private Data
        Pointer to sibling invocation map
        Pointer to child invocation map
    Pointer to next invocation map for same procedure
    Pointer to Parent invocation Map
        }
```

The above method includes setting the 'use flag' for a procedure invocation map to '1' at the start of the execution and resetting it at the end of the execution of the procedure.

The above method includes setting the 'Save Flag' in said invocation map for saving the parameters for reuse by a subsequent invocation of the procedure.

The above method includes constructing said invocation map to initialize any parameter within its enclosed procedural hierarchy including initialization before calling at the structure level so as to avoid creation of multiple copies of the said parameter.

The above method includes supporting recursion and iteration of procedures for which the number of times the procedure will be invoked is known only during run-time.

The above method includes pre-allocation of the data areas for said invocation map which can grow along with program execution.

The above method includes declaring of said invocation map data structure only once using hierarchical declaration map and the capability of referring to it from anywhere.

The above method includes creating said invocation map data structure as an .imap file during procedure compilation and contains the declaration of the procedure in its own hierarchical map.

The above method includes making said invocation map data structure visible only within the scope of related procedures.

The above method includes allocating a separate data area for each invocation of the invocation map the data being accessible only by its owning thread, such data areas being allocated along with Guard Pages separating each allocation area to avoid possible overlapping.

The instant invention further provides a computer program product comprising a computer readable storage medium having computer readable code embodied therein for causing a computing system to implement parameters passing to a procedure characterized in that it includes computer readable code means configured to cause said computer to pass parameters using an invocation map data structure without using the stack for efficient operation.

The above computer program product includes computer readable code means configured to allow said invocation map data structure to be used repeatedly.

The above computer program product includes computer readable code means configured to operate said invocation map data structure as a shared data repository for several procedures.

The above computer program product includes computer readable code means configured to allow said invocation map data structure to be shared across nested procedures.

The above computer program product includes computer readable code means configured to derive said invocation map data structure from a hierarchical declaration map based on calling relationships between procedures comprising assigning level numbers to each level in the procedure calling hierarchy.

The above computer program product includes computer readable code means configured to construct said invocation map data structure so as to capture the complete hierarchical relationship between the procedures.

The above computer program product includes computer readable code means configured to create and use a new invocation map if the existing invocation map is in use and a concurrent execution is desired.

The above computer program product includes computer readable code means configured to create a new invocation map or use a free invocation map if procedure recursion is required.

The above computer program product includes computer readable code means configured to create said invocation map data structure with a unique map identification and structure it as follows:

```
Invocation Map {Procedure Name
    Instance ID
        Invocation Map Identifier
        Use-flag
    Save-flag
    Saved_program_counter
        Pointer to Parametric data
        Pointer to Private Data
        Pointer to sibling invocation map
        Pointer to child invocation map
    Pointer to next invocation map for same procedure
    Pointer to Parent invocation Map
    }
```

The above computer program product includes computer readable code means configured to set the 'use flag' for a procedure invocation map to '1' at the start of the execution and reset it at the end of the execution of a procedure.

The above computer program product includes computer readable code means configured to set the 'Save Flag' in said invocation map to save the parameters for reuse by a subsequent invocation of the procedure.

The above computer program product includes computer readable code means configured to construct said invocation map so as to initialize any parameter within its enclosed procedural hierarchy including initialization before calling at the structure level so as to avoid creation of multiple copies of the said parameter.

The above computer program product includes computer readable code means configured to support recursion and iteration of procedures for which the number of times the procedure will be invoked is known only during run-time.

The above computer program product includes computer readable code means configured to pre-allocate the data areas for said invocation map and permit growth of such areas along with program execution.

The above computer program product includes computer readable code means configured to declare said invocation map data structure only once using hierarchical declaration map and permit referring to it from anywhere.

The above computer program product includes computer readable code means configured to create said invocation map data structure as an imap file during procedure compilation and have it contain the declaration of the procedure in its own hierarchical map.

The above computer program product includes computer readable code means configured to render said invocation map data structure visible only within the scope of related procedures.

The above computer program product includes computer readable code means configured to allocate a separate data area for each invocation map accessible only by its owning thread, such data areas being allocated along with Guard Pages separating each allocation area to avoid possible overlapping.

BRIEF DESCRIPTION OF THE DRAWINGS

The invention will now be described with reference to the accompanying drawings.

FIG. 6A shows how the same parameter passing as in FIG. 6 can be done more efficiently using invocation maps.

FIG. 7A shows how the same repetitive program as in FIG. 7 can be optimized using invocation maps

DETAILED DESCRIPTION OF THE DRAWINGS

Figure 1:
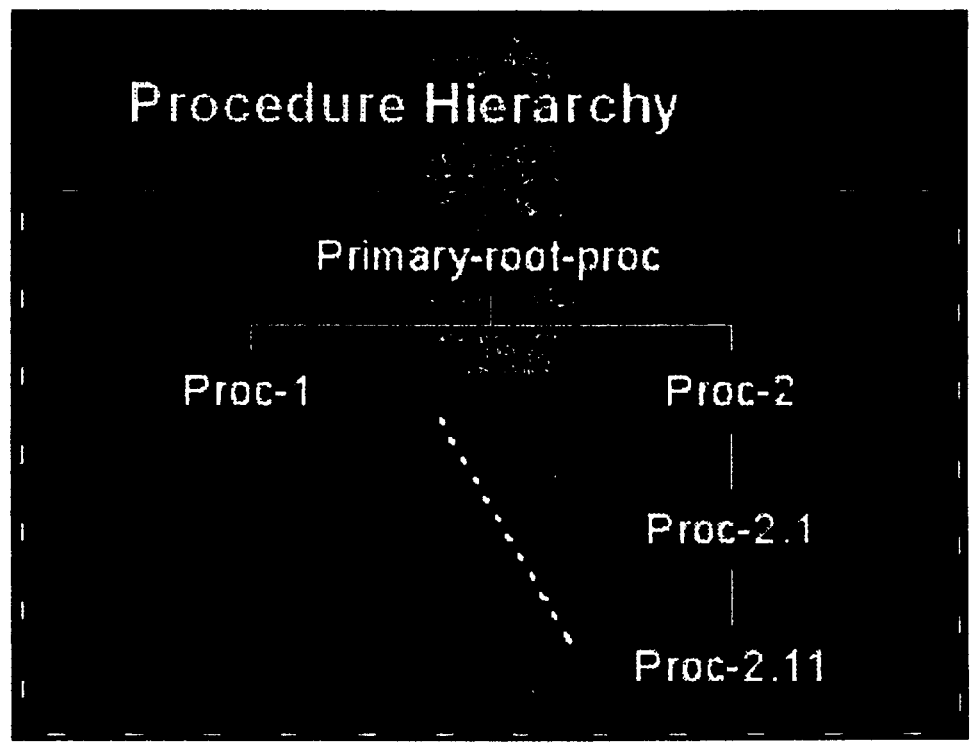
FIG. 1 illustrates a typical procedure hierarchy.

FIG. 1 illustrates a typical procedure hierarchy. Here the nodes represent procedures. The lines between procedures indicates that a procedure at the root of a line calls the procedure at its end. The solid line indicates the most predominant consumer of the services of a procedure.

Figure 2:
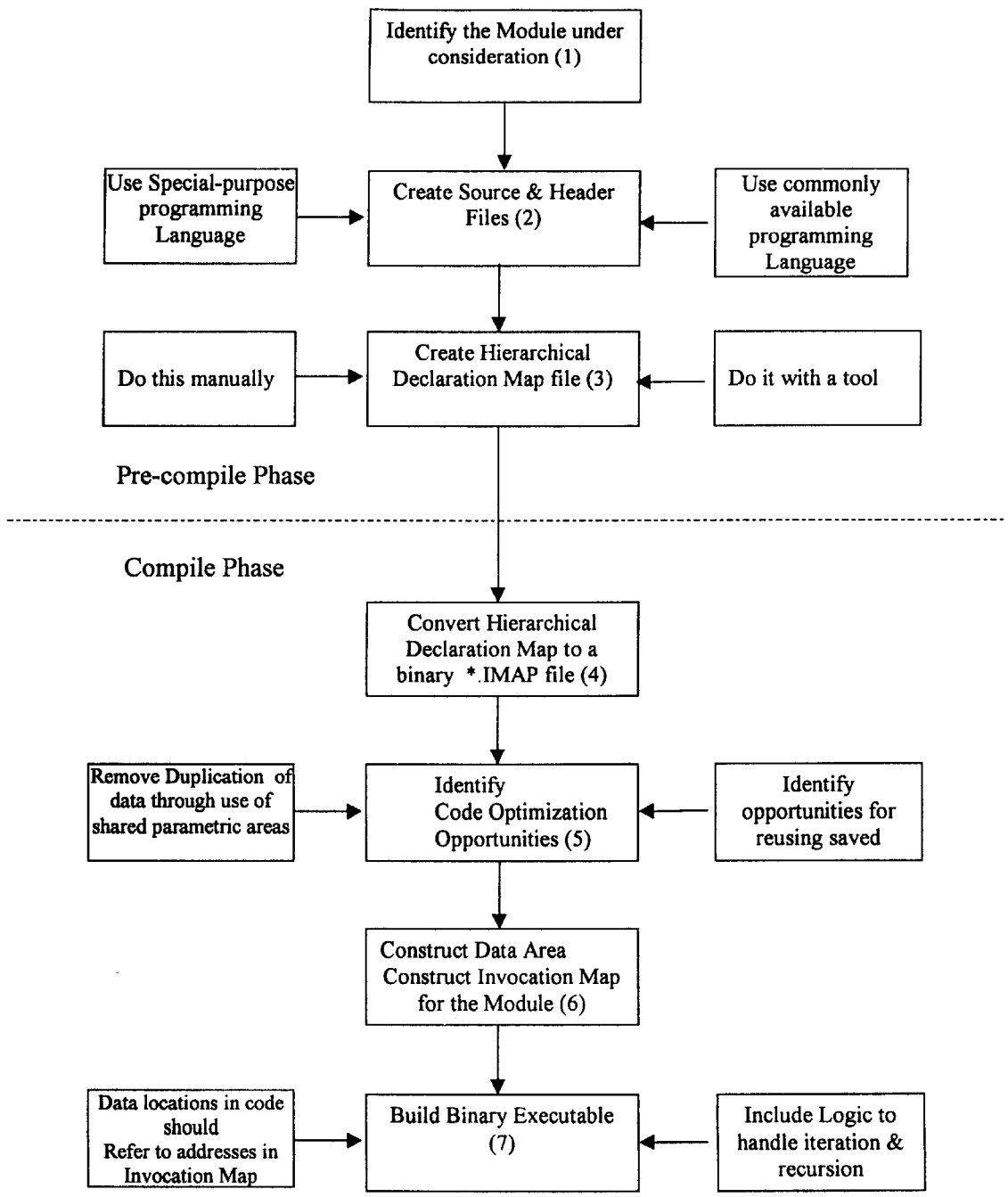
FIG. 2 illustrates a hierarchical declaration map for the procedure hierarchy of FIG. 1.

FIG. 2 illustrates a hierarchical declaration map for the procedure hierarchy shown in FIG. 1. The procedures are nested in accordance with the procedure hierarchy. Each procedure declaration includes a data declaration block with itself. The hierarchical declaration map will be used by the compiler to generate a *.imap binary file.

To take care of a situation where procedure 2.11 being called also by procedure 1, the redefinition statement is used by adding a dummy procedure 1.1, which represents the invocation of procedure 2.11. In the case of redefinition, the data block definition need not be repeated.

Figure 3:
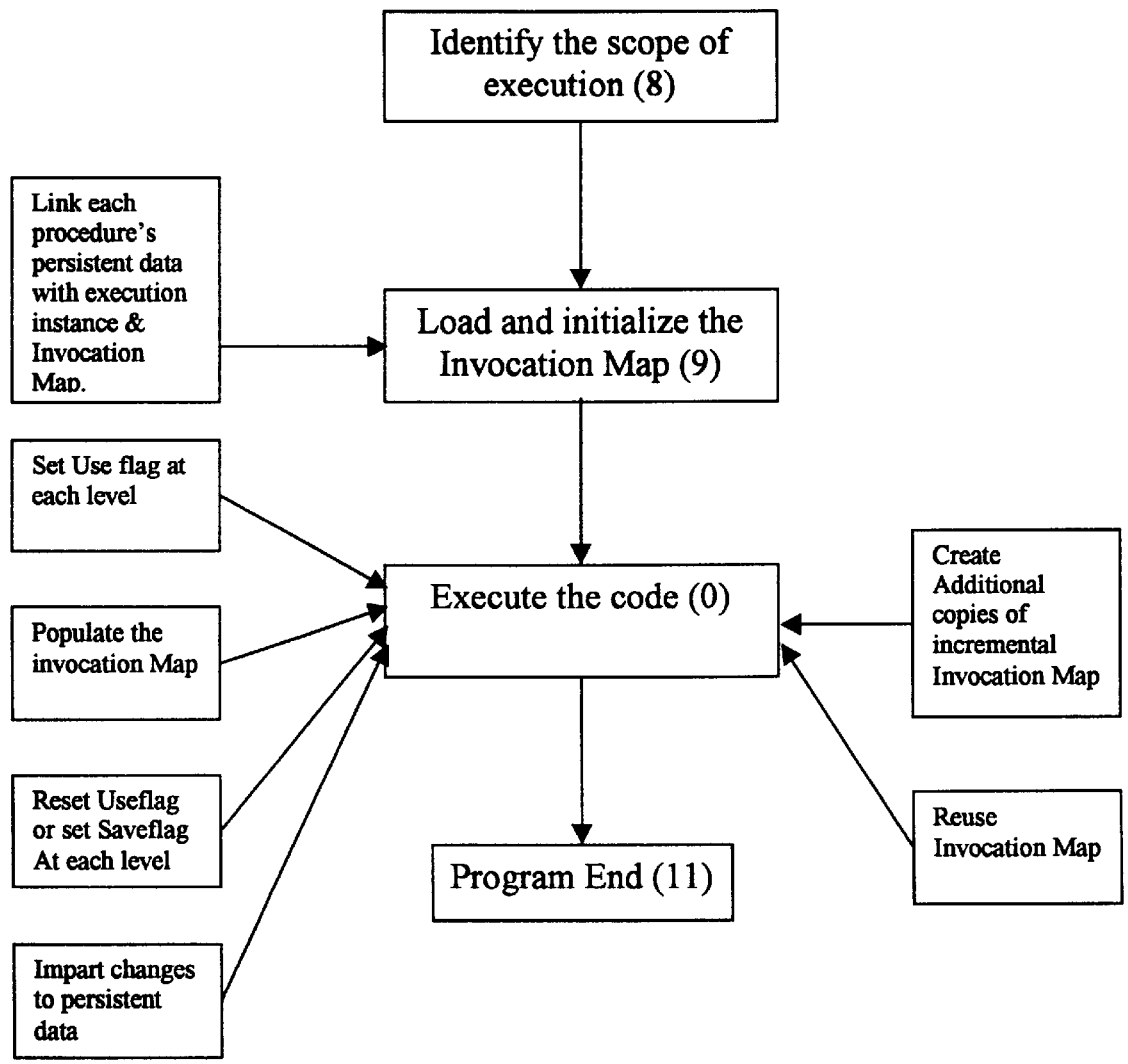
FIG. 3 illustrates a typical data declaration block.

FIG. 3 illustrates a typical data declaration block. There are 3 types of data namely Persistent: This data persists even after completion of a procedure and the results are saved and available during next invocation of the procedure. Each persistent data item needs to be bound to an instance of a program.

Private: This data is initialized during the invocation of a procedure and invalidated at the end of execution of a procedure.

Parametric: This data is typically input/output parameters used to exchange information between calling and called procedures. The scope of the parametric data includes data that is useable by a procedure that is nested within its block.

Figure 4:
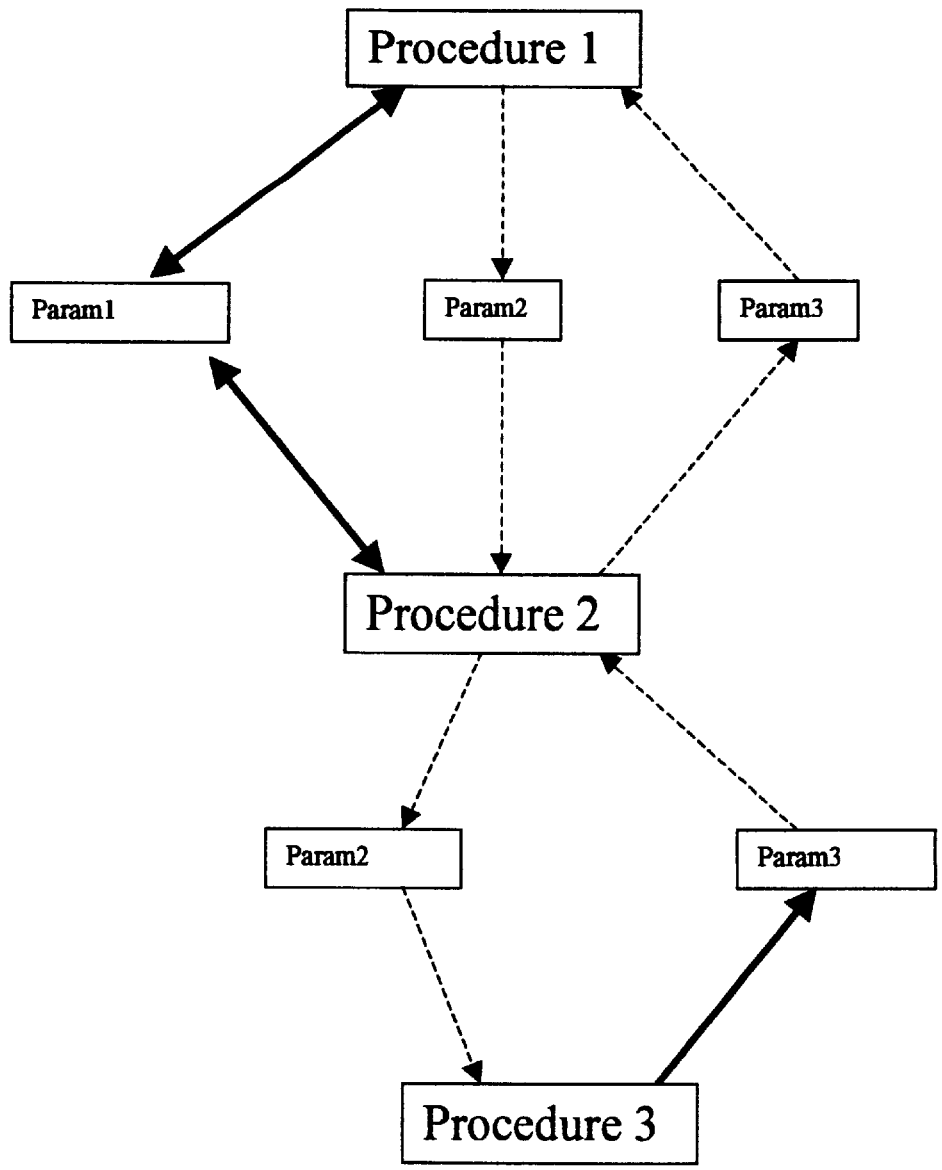
FIG. 4 shows the steps required for creation of an executable using invocation maps.

FIG. 4 describes the steps required for creation of an executable that makes use of invocation map. This can be divided into two phases viz.

Pre-compile phase

Compilation phase

In the pre-compilation phase the system identifies each module (1) and creates source and header files (2) using a special purpose or commonly available programming language. The source and header files are then used to create a hierarchical declaration map file (3) either manually or with the help of a tool. In the compilation phase, the hierarchical declaration map file is converted to a binary *.IMAP file (4). The computer then identifies code optimization opportunities (5) such as removing duplication of data through shared parametric areas and/or reusing saved invocation maps and optimization of computation steps. The optimization is followed by construction of data area and invocation map for the module (6). A final build of the binary executable (7) is then carried out in which data locations in the code refer to addresses in the invocation map and logic to handle iterations and recursion us included.

Figure 5:
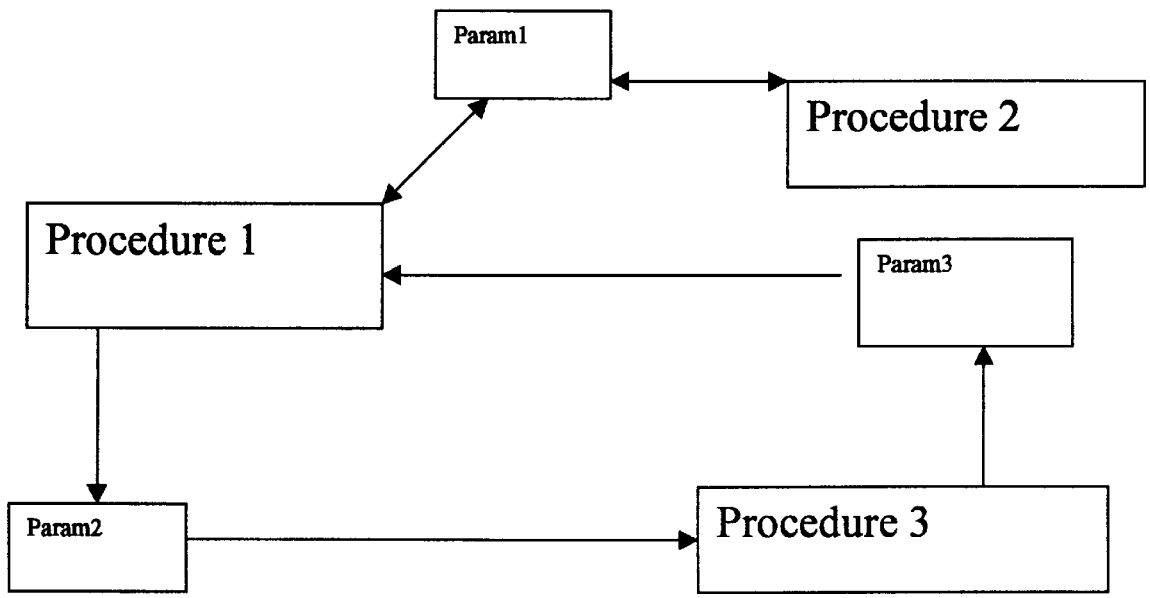
FIG. 5 shows the status of the invocation map during the execution of the program.

The FIG. 5 below shows the status of invocation map during program execution. Initially the scope of execution is defined (8) followed by loading and initialization of the invocation map (9), during which each procedures persistent data is linked with the execution instance and the invocation map. The code is then executed (10) including the steps of:

setting 'use' flag at each level populating the invocation map resetting 'use' flag or setting 'save' flag at each level after execution imparting changes to persistent data based on execution results creating additional copies of incremental invocation map where required reusing invocation map wherever possible This completes the process (11)

Note:

Handling Iterative Execution

The use-flag for the procedure's invocation map is set to 1 at the start of execution and reset at the end of execution of a procedure. The same data areas can be reused to load parameters and initialize private data.

Handling Concurrent (Multi-thread) Execution

When a concurrent execution is attempted if the existing invocation maps are in use, a new map is created and used.

Handling Recursion

A new map is created (or a free map is used) which is different from the caller's map.

Reuse

The past effort of loading the parameters can be exploited by reuse of a loaded parametric area in the next invocation. This is achieved by save-flag in the invocation map. (This would mean that use-flag checks should be done in conjunction with save-flag checks).

Persistent Data Instantiation

The persistent data needs to be separately instantiated vis-à-vis Invocation Maps as the persistent data is expected to last even after the end of execution of a procedure. It is done using the following data structure.

```
Procedure Instance Table {1 to Maximum Instances)
Instance ID
Pointer to Root Invocation Map
Persistent-Data-Instance (PDI)
    Procedure Name
    Pointer to Persistent Data
    Init-flag
    Pointer to invocation Map Head node
    Pointer to Parent PDI
    Pointer to sibling PDI
    Pointer to child PDI
}
```

Instance ID uniquely identifies a persistent data block that is associated with a given instance of a program as the case may be. For each module there can be a root procedure that holds common persistent data for its children nodes. Init-flag indicates if the data item is already initialized.

Figure 6:
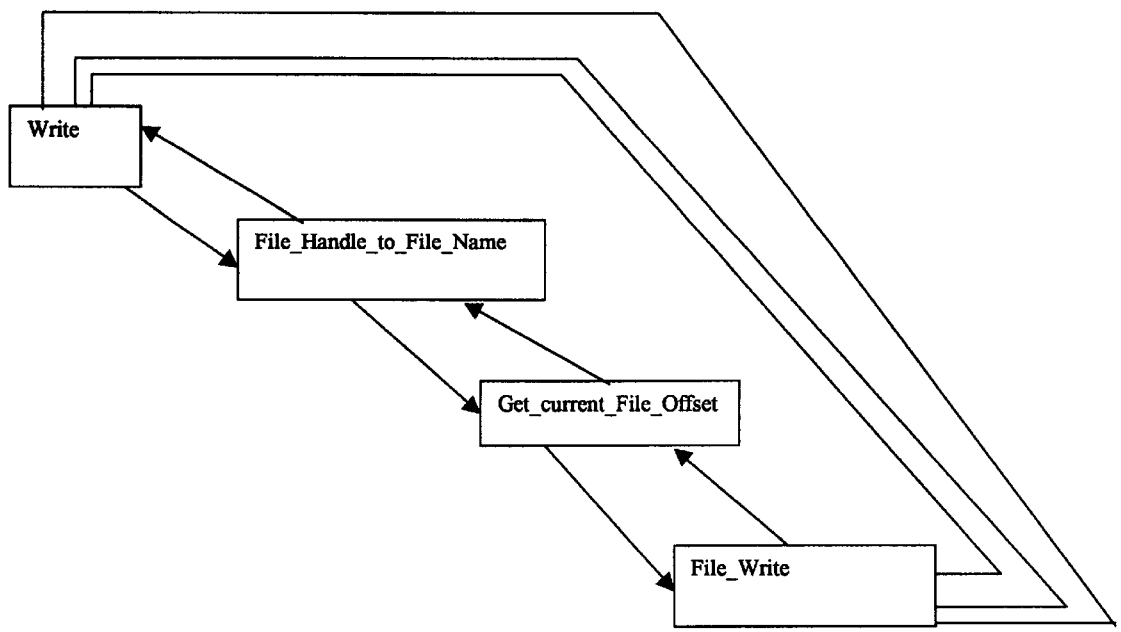
FIG. 6 illustrates the mode of parameter passing in a conventional programming system.

FIG. 6 illustrates the mode of parameter passing in a conventional programming system.

Note:
The set of steps that are expected to be executed can be represented using the following hypothetical intermediate code Language.
Proceure1:
Procedure2.param1 = p1;
Procedure3.param2 = p2;
Call Procedure2;
Printf (The output is %d ", Procedure2.param2);
Printf ("The output is %d. .", Procedure1.param3);
End Call Procedure2; /* This results in the Lower Invocation Maps available for reuse*/
Return
Procedure2:
Procedure2.param1 = p1 + q2;
Call Procedure3;
Return;
Procedure3:
Procedure1.param3 = Procedure3.param2 * q5;
Return;

Parameter 1 and parameter 2 are passed from calling procedure 1 to called procedure 2, while parameter 2 is further passed on by procedure 2 to procedure 3 called by it. Procedure 3 returns the result as parameter 3. Procedure 2 passes parameter 3 to calling procedure 1.

FIG. 6A, illustrates how the same can be done more efficiently in Invocation Map based Architecture. The forward arrows indicate input parameters; backward arrows indicate output parameters. The dashed line indicates no change happened to the parameter along the arrow under consideration, the solid line indicates otherwise.

Figure 7:
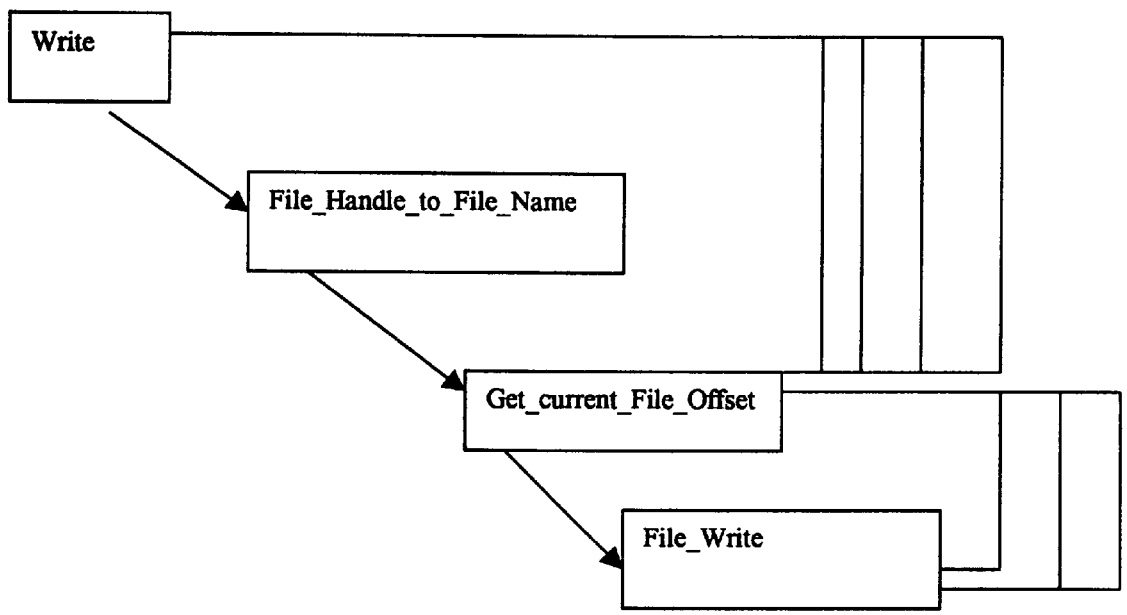
FIG. 7 illustrates how a repetitive program is executed in a conventional programming system

The FIG. 7 illustrates how a repetitive program is executed in conventional program execution model. The piece of code under consideration is given below:

@Out__buf-ptr=@Out__buf__start

For I:=1 to 4 do begin

Write (File__Handle, 256, @Out__buf__ptr);

@Out__buf__ptr :=@Out__buf__ptr+256;

end

Each call to write results in all the three inner procedures being called 4 times. FIG. 7A illustrates how the same can be optimized using Invocation Map based architecture. In FIG. 7A, the results of $1^{st}$ run are expected to be saved and the procedure File__Handle__to__File__Name is called only once. Again already assigned parameters are saved and only when there are changes in parameter values it results in additional computation steps.

Figure 8:
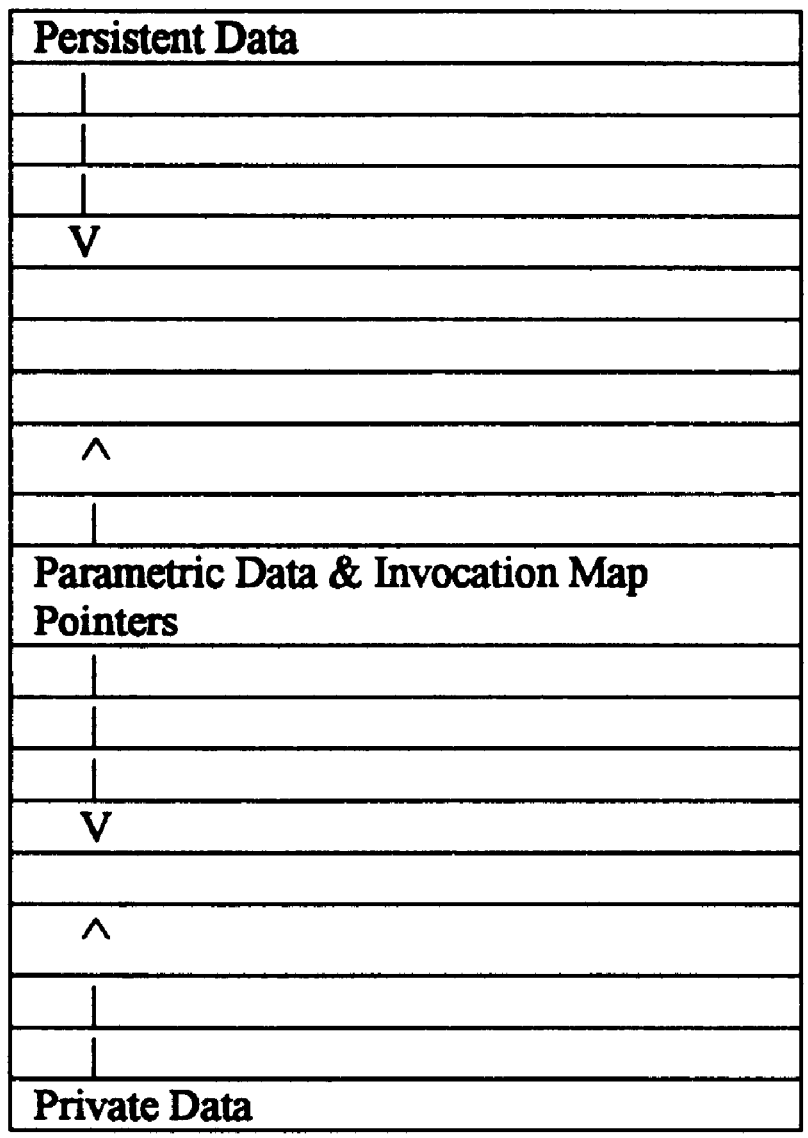
FIG. 8 illustrates the memory layout of program execution data.

The FIG. 8, below illustrates the memory layout of program execution data.

The storage for data can be allocated on heap as follows. This only serves to isolate private and shared data areas. Compiler is expected to check private data is accessed only when allowed and shared data only when the particular procedure has access to it.

NOTE:

All process data is protected from access by any other process as any such access is expected to create a general protection fault or a similar error. Within the process, the persistent data of procedures that is accessible by multiple threads will need to be protected using coordination mechanism if multiple threads can access it at the same time, as in accessing any shared resource.

Since each invocation has separate area allocated, the data areas of such invocations are accessed only by the owning thread. The invocation maps again can be allocated in memory with Guard Pages separating different allocation areas. This will let invocation maps to grow without stepping over one another.

What is claimed is:

1. In a computing system containing at least one processor, memory and storage devices and input and output devices, said computing system executing software programs in which parameters are passed to procedures characterized in that the system includes an invocation map data structure means for passing parameters to a procedure without using a stack for more efficient operation wherein said invocation map data structure means is created with a unique map identification and is structured as follows:

---

Invocation Map {Procedure Name
        Instance ID
        Invocation Map Identifier
        Use-flag
        Save-flag
        Saved_program_counter
        Pointer to Parametric data
        Pointer to Private Data
        Pointer to sibling invocation map
        Pointer to child invocation map
        Pointer to next invocation map for same procedure
        Pointer to Parent invocation Map
        }.

---

2. A system as claimed in claim 1 wherein said invocation map data structure means has the facility to be used repeatedly.

3. A system as claimed in claim 1 wherein said invocation map data structure means is a shared data repository for several procedures.

4. A system as claimed in claim 1 wherein said invocation map data structure means includes the facility to be shared across nested procedures.

5. A system as claimed in claim 4 wherein said invocation map data structure means is visible only within the scope of related procedures.

6. A system as claimed in claim 1 wherein said invocation map data structure means is derived from a hierarchical declaration map means based on calling relationships between procedures, comprising assigning level numbers to each level in a procedure calling hierarchy.

7. A system as claimed in claim 1 wherein said invocation map data structure means is constructed to capture complete hierarchical relationship between the procedures.

8. A system as claimed in claim 1 wherein a new invocation map data structure means is created and used if an existing invocation map data structure means is in use and a concurrent execution is desired.

9. A system as claimed in claim 8 wherein each invocation of the invocation map data structure means is allocated a separate data, area such data areas being allocated along with Guard Pages separating each allocation area to avoid possible overlapping.

10. A system as claimed in claim 1 wherein a new invocation map data structure means is created or a free invocation map data structure means is used if procedure recursion is required.

11. A system as claimed in claim 1 wherein the 'use flag' for a procedure invocation map data structure means is set to '1' at the start of the execution and reset at the end of the execution of a procedure.

12. A system as claimed in claim 1 wherein the 'Save Flag' in said invocation map data structure means saves the parameters for reuse by a subsequent invocation of the procedure.

13. A system as claimed in claim 1 wherein said invocation map data structure means is constructed to initialize any parameter within an enclosed procedural hierarchy including initialization before calling at the structure level so as to avoid creation of multiple copies of the said parameter.

14. A system as claimed in claim 1 wherein said invocation map data structure means supports recursion and iteration of procedures for which the number of times the procedure will be invoked in known only during run-time.

15. A system as claimed in claim 1 wherein the data areas for said invocation map data structure means are pre-allocated and can grow along with program execution.

16. A system as claimed in claim 1 wherein said invocation map data structure means is declared only once using hierarchical declaration map and referred from anywhere.

17. A system as claimed in claim 1 wherein said invocation map data structure means is created as an .imap file during procedure compilation and contains a declaration of the procedure in a hierarchical map.

18. A method for passing parameters to a procedure characterized in that the method uses an invocation map data structure to pass parameters to the procedure without using a stack, for more efficient operation, wherein the method includes creating said invocation map data structure with a unique map identification and structuring the invocation map data structure follows:

---

Invocation Map {Procedure Name
        Instance ID
        Invocation Map Identifier
        Use-flag
        Save-flag
        Saved_program_counter
        Pointer to Parametric data
        Pointer to Private Data
        Pointer to sibling invocation map
        Pointer to child invocation map
        Pointer to next invocation map for same procedure
        Pointer to Parent invocation Map
        }.

---

19. A method as claimed in claim 18 wherein said invocation map data structure can be used repeatedly.

20. A method as claimed in claim 18 wherein said invocation map data structure is a shared data repository for several procedures.

21. A method as claimed in claim 18 wherein said invocation map data structure could be shared across nested procedures.

22. A method as claimed in claim 21 wherein the method includes making said invocation map data structure visible only within a scope of related procedures.

23. A method as claimed in claim 18 wherein the method includes deriving of said invocation map data structure from a hierarchical declaration map based on calling relationships between procedures comprising assigning level numbers to each level in a procedure calling hierarchy.

24. A method as claimed in claim 18 wherein the method includes constructing of said invocation map data structure comprising capturing of a complete hierarchical relationship between the procedures.

25. A method as claimed in claim 18 wherein the method includes creating and using of a new invocation map if an existing invocation map is in use and a concurrent execution is desired.

26. A method as claimed in claim 25 wherein the method includes allocating a separate data area for each invocation of the invocation map, such data areas being allocated along with Guard Pages separating each allocation area to avoid possible overlapping.

27. A method as claimed in claim 18 wherein the method includes creating a new invocation map or using a free invocation map if procedure recursion is required.

28. A method as claimed in claim 18 wherein the method includes setting the 'use flat' for a procedure invocation map to '1' at the start of the execution and resetting the use flag at the end of the execution of the procedure.

29. A method as claimed in claim 18 wherein the method includes setting the 'Save Flag' in said invocation map for saving the parameters for reuse by a subsequent invocation of the procedure.

30. A method as claimed in claim 18 wherein the method includes constructing said invocation map to initialize any parameter within an enclosed procedural hierarchy including initialization before calling at the structure level so as to avoid creation of multiple copies of the said parameter.

31. A method as claimed in claim 27 wherein the method includes supporting recursion and iteration of procedures for which the number of times the procedure will be invoked is known only during run-time.

32. A method as claimed in claim 27 wherein the method includes pre-allocation of the data areas for said invocation map, which can grow along with program execution.

33. A method as claimed in claim 27 wherein the method includes declaring of said invocation map data structure only once using hierarchical declaration map and the capability of referring to the invocation map data structure from anywhere.

34. A method as claimed in claim 27 wherein the method includes creating said invocation map data structure as an .imap file during procedure compilation and contains a declaration of the procedure in a hierarchical map.

35. A computer program product comprising a computer readable storage medium having computer readable code embodied therein for causing a computing system to implement parameters passing to a procedure characterized in that the computer program product includes computer readable code means configured to cause said computer to pass parameters using an invocation map data structure without using a stack for efficient operation, wherein the computer program product includes computer readable code means configured to create said invocation map data structure with a unique map identification and structure the invocation map data structure as follows:

Invocation Map {Procedure Name
   Instance ID
     Invocation Map Identifier
     Use-flag
   Save-flag
   Saved_program_counter
     Pointer to Parametric data
     Pointer to Private Data
     Pointer to sibling invocation map
     Pointer to child invocation map
   Pointer to next invocation map for same procedure
   Pointer to Parent invocation Map
   }.

36. A computer program, product as claimed in claim 35 wherein the computer program product includes computer readable code means configured to allow said invocation map data structure to be used repeatedly.

37. A computer program product as claimed in claim 35 wherein the computer program product includes computer readable code means configured to operate said invocation map data structure as a shared data repository for several procedures.

38. A computer program product as claimed in claim 35 wherein the computer program product includes computer readable code means configured to allow said invocation map data structure to be shared across nested procedures.

39. A computer program product as claimed in claim 38 wherein the computer program product includes computer readable code means configured to render said invocation map data structure visible only within the scope of related procedures.

40. A computer program product as claimed in claim 35 wherein the computer program product includes computer readable code means configured to derive said invocation map data structure from a hierarchical declaration map based on calling relationships between procedures comprising assigning level numbers to each level in a procedure calling hierarchy.

41. A computer program product as claimed in claim 35 wherein the computer program product includes computer readable code means configured to construct said invocation map data structure so as to capture a complete hierarchical relationship between the procedures.

42. A computer program product as claimed in claim 35 wherein the computer program product includes computer readable code means configured to create and use a new invocation map if an existing invocation map is in use and a concurrent execution is desired.

43. A computer program product as claimed in claim 42 wherein the computer program product includes computer readable code means configured to allocate a separate data area for each invocation of the invocation map, such data areas being allocated along with Guard Pages separating each allocation area to avoid possible overlapping.

44. A computer program product as claimed in claim 35 wherein the computer program product includes computer readable code means configured to create a new invocation map or use a free invocation map if procedure recursion is required.

45. A computer program product as claimed in claim 35 wherein the computer program product includes computer readable code means configured to set the 'use flag' for a procedure invocation map to '1' at the start of the execution and reset the use flag at the end of the execution of a procedure.

46. A computer program product as claimed in claim 35 wherein the computer program product includes computer readable code means configured to set the 'Save Flag' in said invocation map to save the parameters for reuse by a subsequent invocation of the procedure.

47. A computer program product as claimed in claim 35 wherein the computer program product includes computer readable code means configured to construct said invocation map so as to initialize any parameter within an enclosed procedural hierarchy including initialization before calling at the structure level so as to avoid creation of multiple copies of the said parameter.

48. A computer program product as claimed in claim 35 the computer program product includes computer readable code means configured to support recursion and iteration of procedures for which the number of times the procedure will be invoked is known only during run-time.

49. A computer program product as claimed in claim 35 wherein the computer program product includes computer readable code means configured to pre-allocate the data areas for said invocation map and permit growth of such areas along with program execution.

50. A computer program product as claimed in claim 35 wherein the computer program product p includes computer readable code means configured to declare said invocation map data structure only once using hierarchical declaration map and permit referring to the invocation map data structure from anywhere.

51. A computer program product as claimed in claim 35 wherein the computer program product includes computer readable code means configured to create said invocation map data structure as an .imap file during procedure compilation, wherein the invocation map data structure contains a declaration of the procedure in a hierarchical map.

* * * * *